United States Patent [19]

Schäff

[11] 4,104,574
[45] Aug. 1, 1978

[54] STEPPING MOTOR CONTROL ARRANGEMENT

[75] Inventor: Ulrich Schäff, Erlangen, Germany

[73] Assignee: Siemens Aktiengesellshaft, Munich Germany

[21] Appl. No.: 781,432

[22] Filed: Mar. 25, 1977

Related U.S. Application Data

[63] Continuation of Ser. No. 560,403, Mar. 20, 1975, abandoned.

[30] Foreign Application Priority Data

Mar. 26, 1974 [DE] Fed. Rep. of Germany ....... 2414627

[51] Int. Cl.² ............................................ H02K 37/00
[52] U.S. Cl. .................................................. 318/696
[58] Field of Search ......................... 318/685, 696, 138

[56] References Cited

U.S. PATENT DOCUMENTS

| | | | |
|---|---|---|---|
| 3,411,058 | 11/1968 | Madsen et al. | 318/696 |
| 3,475,667 | 10/1969 | Newell | 318/696 |
| 3,555,381 | 1/1971 | Rappaport | 318/696 |
| 3,805,138 | 4/1974 | Hilker | 318/696 |
| 3,869,656 | 3/1975 | Kennedy et al. | 318/696 |
| 3,886,459 | 5/1975 | Hufford et al. | 318/696 X |

*Primary Examiner*—Gene Z. Rubinson
*Attorney, Agent, or Firm*—Kenyon & Kenyon, Reilly, Carr & Chapin

[57] ABSTRACT

In a control arrangement for driving a stepping motor through a digital frequency smoothing circuit, means are provided to supply the first input pulse to the smoothing circuit directly to the output circuit and to suppress the last output pulse from the frequency smoother to thereby obtain the advantages of frequency smoothing while at the same time speeding up the response of the system.

2 Claims, 3 Drawing Figures

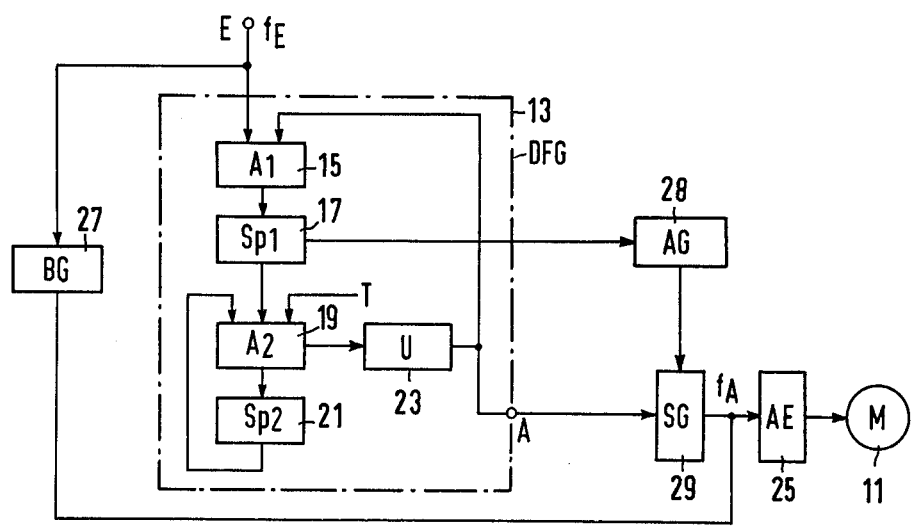
Fig. 1
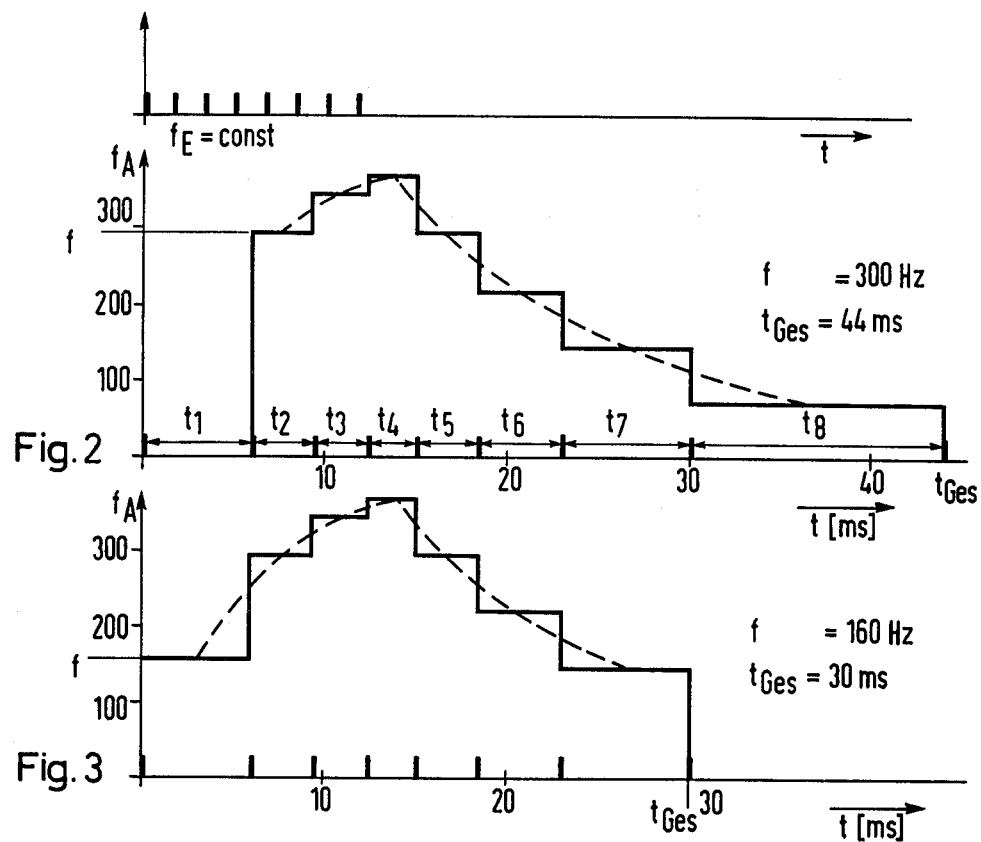
Fig. 2
Fig. 3

STEPPING MOTOR CONTROL ARRANGEMENT

This is a continuation of application Ser. No. 560,403 filed Mar. 20, 1975 now abandoned.

BACKGROUND OF THE INVENTION

This invention relates to the control of stepper motors in general and more particularly to an improved control arrangement for such motors utilizing a digital frequency smoother.

Stepper motors or stepping motors are being used with increasing frequency as the drive elements of movable machine parts such as in machine tool controls and in office machines. However, groups of control pulses for the stepping motors are often furnished thereto by control systems at an erratic or irregular intervals. Since stepping motors can handle pulse jumps only within given limits, it therefore becomes necessary to smooth these frequency jumps. This problem can be solved, without using analog elements through the use of what is known as digital frequency smoothing. Such digital frequency smoothing is disclosed in a paper entitled "Digital Solutions of Control Problems in Numerical Path Controls", by Gose, published in "Regelungstechnische Praxis und Prozess-Rechentechnik" 1973, No. 7, pages 167 ff, in Sections 4 and 5, pages 169-170.

When a series of $m$ pulses at constant frequency $f_E$ is supplied to the input of the digital frequency smoother, there will be provided at the output of the frequency smoother a series of $m$ pulses but with a variation in frequency. Starting with an initial value the output frequency increases according to an exponential function until it reaches, with a sufficiently large number of pulses, the value of the input frequency and then again decreases exponentially once the input pulses are terminated. It will be recognized that for a small number of input pulses equilibrium is not reached. However, the exponential raising and falling of the output frequency still remains.

A property of such frequency smoothing is that the output pulses are considerably delayed in relation to the input pulses. Even the first output pulse lags behind the first input pulse. Furthermore, due to the exponential decay of the frequency there is an extremely long time delay between the next to the last and the last output pulse in proportion to the total time sequence of the pulse series.

In very many applications, e.g. in machine tool controls, these two properties do not play an important role. That is to say the delays can be easily tolerated. However, in cases where, in addition to a requirement for frequency smoothing and pulse preservation, the drive unit equipped with the stepping motor must meet special requirements as to the time to reach an exact positioning, such a control is inadequate. An example of this type of apparatus is an electric typewriter in which the stepping motor is used for positioning the carriage carrying the typing head, or the typing head itself. In order to be able to reach a desired typing frequency of, for example 20 Hz (50 ms per character) the carriage or head movement must be executed in 30 ms.

It would be possible to condense the time sequence of the output pulses being provided from the digital smoothing apparatus by increasing its computing frequency. However, such an increase would also result in the time constant of the frequency increase being shortened and the starting frequency of motor increased. However, since the stepping motor can be operated only at a limited start and/or stop frequency, the motor cannot follow the pulse pattern that is required in typewriter technology and conventional digital frequency smoothing cannot be readily used to fulfill all requirements.

In view of these problems the need for an improved system which offers the advantages of digital frequency smoothing but eliminates the disadvantages of delays and a long settling time becomes evident.

SUMMARY OF THE INVENTION

The present invention provides for such a system. Starting out with a stepping motor driven through a digital frequency smoothing apparatus, means are provided to cause the first input pulse to the smoothing apparatus to be fed directly to the stepping motor and to suppress the last pulse out of the digital frequency smoothing apparatus. In this manner, the correct number of pulses are provided but the first pulse is provided immediately and the long time delay associated with the last pulse is avoided.

The means, which are associated with the digital frequency smoothing apparatus to carry this process out, include means for determining the last output pulse and blocking means responsive thereto and coupled in the output line of the digital frequency smoothing apparatus to suppress the output pulse. In addition, a bridge means coupled to the input pulse is provided. Its output, along with the output of the blocking means, is connected to the input control line of the drive motor.

BRIEF DESCRIPTION OF THE DRAWINGS

FIG. 1 is a block diagram illustrating the system of the present invention.

FIG. 2 is a diagram illustrating the input and output of a digital frequency smoothing apparatus according to the prior art illustrating both timing and frequency.

FIG. 3 is a similar figure illustrating the output of the present invention.

DETAILED DESCRIPTION OF THE PREFERRED EMBODIMENT

FIG. 1 illustrates in block diagram form a system according to the present invention for driving a stepping motor 11. Included in the system is a digital frequency smoother 13 constructed according to the aforementioned paper by Gose. The digital frequency smoother 13 has an input terminal E and an output terminal A. The digital frequency smoother comprises a first adder 15 having its output coupled to a first storage means 17. The output of the first storage means is one input to a second adder 19 which has as its second input a pulse train T from a suitable clock and as its third input the output of an additional storage means 21 having an input from the adder 19. The adder 19 also has a carry output coupled to a carry detector 23 whose output is fed back as second input to the adder 15 and is provided to the output terminal A.

The adders 15 and 19 operate synchronously at the same clock frequency. The pulses at the input E are clocked at this frequency and this frequency is provided to the adder 19 over the line designated T. An incoming pulse such as the pulse shown in the upper part of FIG. 2 is coupled through the adder 15 to the storage means 17 causing it to increment by one. At the same time as this occurs, the adder 19, in response to the clock pulse on line T, is adding the number stored in the storage means 17 and the number stored in storage means 21 and stores the result back in the storage means 21. The adder 19 has a threshold of binary 1000. That is to say when the result of the addition has a 1 in the fourth position, i.e., equivalent to a decimal 8, a carry is generated and detected by the carry detector 23. This is fed back as a subtractive input to the adder 15.

The operation of this frequency smoother can best be understood with reference to FIG. 2. Shown on the top are a series of eight pulses at a constant frequency $f_E$. These eight pulses might represent, for example, the pulses required to advance the carriage of a typewriter one character. That is to say, eight incremental steps of the stepping motor is equivalent to one character spacing. With these pulses as an input to the digital frequency smoother 13 of FIG. 1 the output will be as shown on the lower curve of FIG. 2. The first output pulse at terminal A will not occur until after a time delay of approximately 6 ms, i.e. $t1 = 6$ ms. The remaining pulses will occur after the time delays indicated, i.e. $t2, t3 \ldots t8$.

What occurs is that on the first clock cycle the first pulse of the upper part of FIG. 2 is coupled through adder 15 and a 1 becomes stored in storage means 17. At this time, the storage means 21 is storing zero. On the next pulse the adder 19 adds the 1 stored in storage means 17 to the 0 in storage means 21 and puts it back in storage means 21. At the same time, the second pulse is coupled through the adder 15 and increments the storage means 17 by one. Storage means 17 is now storing the binary number 0010. With the third pulse the value in the storage means 17 is added to the 1 in the storage means 21 to obtain an answer of 3, i.e., binary 0011. At the same time, the next pulse increments the storage means 17 by one and it has the stored therein 3, i.e., in binary form 0011. When the next or fourth input pulse occurs the 3 in storage means 17 is added to the 3 in storage means 21 to result in an answer of 6 and the storage means 17 incremented again to have stored therein 4. Now, on the next pulse with 6 stored in storage means 21 and 4 stored in the storage means 17 there will be a result of 10 i.e., binary 1010 causing a carry output from the adder 19. This carry has a value of 8 and a value of 2, i.e., binary 0010, will remain stored in the storage means 21. This carry is fed back as a subtractive input to the adder 15 and on the next or sixth pulse it will cancel out the incoming pulse so that the result out of the adder 15 will be 0, and the storage means 17 will continue to store the number 4. This process continues with an output pulse and feedback pulse being generated each time a carry occurs from the adder 19. After the last pulse, the eighth in the example of the present embodiment, is read in, the feedback from the overflow detector 23 begins to decrement numbers stored in storage means 17. This time becomes longer and longer since a greater number of additions are required with the smaller number in the storage means 17 to reach a point where a carry is generated in the adder 19. It is evident that the last time delay, $t8$, is quite long and as a result the total time to complete the output is approximately 44ms. This figure also illustrates the frequency of pulses as they are being output. Thus, based on the time $t2$ between the first and second pulse, the starting frequency will be approximately 300 Hz. The frequency increases as the time between pulses becomes shorter and then lengthens as illustrated in accordance with the exponential function shown by the dotted line. As noted above, when used with a typewriter it is necessary that positioning take place within 30 ms if the desired typing speed is to be maintained. Thus, were this output A connected directly to the drive unit 25 for the motor 11, after a series of input pulses such as shown, 44 ms would be needed for the carriage to be properly positioned. This is an excessive amount of time and unacceptable in this application.

It would be possible to increase the frequency T of the clock within the digital frequency generator to compress the time sequence of the output pulse series illustrated on FIG. 2 so that the time was shorter than 44 ms. However, this would result in a shortening of the time constant of the frequency increase and would thus increase the starting frequency. Since the motor cannot tolerate greater starting frequencies, such a solution is unacceptable.

To solve this problem, the present invention adds to the digital frequency smoother 13 a bridge means 27, comparing means 28 (means for determining the last output pulse) and a gate 29 (blocking means). The bridge means 27, can be a bistable multi-vibrator, i.e. a flip-flop. It is coupled to respond to the first pulse shown on the uppermost curve of FIG. 2 and in response thereto will change its output and provide it as an input to the drive unit 25 for the motor 11. The result will be as shown on FIG. 3. The motor will be advanced one step as soon as the first pulse is received without the delay t1 inherent in the frequency smoother. The next pulse will be provided through the gate 29 from the output terminal A to the drive unit 25. This will occur at a time t1 after the first pulse and will represent a starting frequency of only approximately 160 Hz. Such a starting frequency can be tolerated by the stepping motor much more easily than the higher starting frequency associated with FIG. 2. Since eight pulses were provided at the input, i.e. since eight incremental steps of the motor are desired, means must be provided to insure that only eight output pulses are received by the drive unit 25. The gate 29 and the comparing means 28 accomplish this. They do this by suppressing the last output pulse from the frequency smoother 12. In other words, after the next to last pulse from the frequency smoother, the gate 29, which will preferably be an And gate, must be disabled by an output from the comparing means 28. It is important to note that the suppression of this last pulse which is extremely long, i.e. approximately 14 ms, results in a total time of only 30 ms for the whole process meeting the requirements of the application in question. The comparing means 28 is coupled to the storage means 17 in the digital frequency smoother and is arranged to provide a disabling output when the value stored in that storage means equals one. This indicates that there is only one pulse left to be executed by the frequency smoother. The comparing means 28 can have associated therewith time delay means to insure that it is not activated until the full pulse count is read into the digital frequency smoother. This can be accomplished in simple fashion by including a monostable multi-vibrator in the circuit which has a time period equal to the maximum time required for the input pulses to be fed into the digital frequency smoother 13.

It will be recognized that, as shown on FIG. 3, the required eight pulses, indicating eight steps of the motor, will occur in a time frame which is compressed greatly with respect to that of FIG. 2 and which at no time exceeds the operating frequency which the stepping motor can tolerate. In other words, through the system of the present invention a reduction in the starting frequency of the motor is accomplished and at the same time a shortening of the total time to the output pulse series. Only through these measures is it possible to make use of the favorable properties of digital frequency smoothing in an application such as an electric typewriter.

In summary, in accordance with the embodiment of FIG. 1 all input pulses are provided to both the digital frequency smoother 13 and the bridge means 27. Only the first pulse is allowed to pass through the bridge means 27 to the drive means 25 for motor 11. The first pulse and remaining pulses are delayed and smoothed through the digital frequency smoother and provided as outputs at the terminal A and through the gate 29 to the drive means 25. Since an additional pulse was provided in the beginning through the bridge 27 the last pulse from the digital frequency smoother is suppressed by disabling the gate 29.

Since the start frequency for a stepping motor is limited, it must not be exceeded when a digital frequency smoothing apparatus is used during acceleration to operating speed. With a constant input pulse series $f_E$, a given digital frequency smoother and a given frequency in the digital frequency smoother, the acceleration and deceleration time constants of the motor are fixed. However, if it is desired to independently vary acceleration and deceleration time when input pulse series $f_E$ which do not have a constant time period must be used.

These and other modifications may be made without departing from the spirit of the invention which is intended to be limited solely by the appended claims.

What is claimed is:

1. In a control arrangement for driving a stepping motor through a control unit including digital frequency smoothing means, an improved arrangement which permits using such digital frequency smoothing means for a typing head or carriage control of a motor driven typewriter or the like comprising means associated with the digital frequency smoother to cause the first input pulse of an input pulse series supplied thereto to also be supplied directly to the output of the digital frequency smoother and means to suppress the last output pulse from the digital frequency smoother.

2. Apparatus according to claim 1 wherein said means to cause comprise:
   (a) bridging means for coupling said first input pulse to the stepping motor, and said means to suppress comprise:
   (b) a gate coupling the output of said digital frequency smoother to the stepping motor; and
   (c) comparing means coupled to said digital frequency smoother for detecting the point in time where only one pulse remains to be output by said frequency smoother and providing a disabling output to said gate to thereby suppress the last output pulse from said digital frequency smoother.

* * * * *